US009022266B1

(12) United States Patent
Kleppin

(10) Patent No.: US 9,022,266 B1
(45) Date of Patent: May 5, 2015

(54) SADDLEBAG TRAY

(71) Applicant: Mark Kleppin, Chandler, AZ (US)

(72) Inventor: Mark Kleppin, Chandler, AZ (US)

( * ) Notice: Subject to any disclaimer, the term of this patent is extended or adjusted under 35 U.S.C. 154(b) by 0 days.

(21) Appl. No.: 14/312,340

(22) Filed: Jun. 23, 2014

Related U.S. Application Data

(60) Provisional application No. 61/837,792, filed on Jun. 21, 2013.

(51) Int. Cl.
*B60R 9/00* (2006.01)
*B62J 9/00* (2006.01)
*B62J 9/02* (2006.01)

(52) U.S. Cl.
CPC ...... *B62J 9/00* (2013.01); *B62J 9/02* (2013.01)

(58) Field of Classification Search
CPC .................................... B62J 9/00; B62J 9/02
USPC ........................................... 224/413; D3/308
See application file for complete search history.

(56) References Cited

U.S. PATENT DOCUMENTS

| 1,839,862 | A | * | 1/1932 | Bartlett | 190/12 R |
|---|---|---|---|---|---|
| 4,171,760 | A | * | 10/1979 | Gay | 224/241 |
| 5,011,013 | A | * | 4/1991 | Meisner et al. | 206/373 |
| D327,562 | S | * | 6/1992 | Brightbill | D3/308 |
| D422,788 | S | * | 4/2000 | Carr | D3/309 |
| 6,068,095 | A | * | 5/2000 | Glembocki et al. | 190/127 |
| 6,161,739 | A | * | 12/2000 | Bentzen | 224/153 |
| 6,595,604 | B1 | * | 7/2003 | Peterson | 312/3 |
| D492,113 | S | * | 6/2004 | Bayer et al. | D3/310 |
| D607,200 | S | * | 1/2010 | Prater | D3/231 |
| 8,408,437 | B1 | * | 4/2013 | Ponsaa | 224/429 |
| 8,925,778 | B1 | * | 1/2015 | Gordon | 224/413 |
| 2009/0224015 | A1 | * | 9/2009 | Jones | 224/413 |

* cited by examiner

*Primary Examiner* — Justin Larson
(74) *Attorney, Agent, or Firm* — Plager Schack LLP

(57) ABSTRACT

A saddlebag tray system is configured to operate in conjunction with a saddlebag having a saddlebag rear protrusion and a saddlebag forward protrusion. The saddlebag tray system includes a tray configured to entirely traverse the saddlebag and further including: a tray bottom mechanically coupled to side walls which are configured to accommodate the saddlebag rear protrusion and the saddlebag forward protrusion. A plurality of brackets are mechanically coupled to the saddlebag. The side walls are configured to accommodate the plurality of brackets. A handle is mechanically coupled to the tray bottom. Lifting the tray with the handle is configured to lift the tray from the plurality of brackets in the saddlebag.

3 Claims, 3 Drawing Sheets

SADDLEBAG TRAY

RELATED APPLICATION

This application claims priority to provisional patent application U.S. Ser. No. 61/837,792 filed on Jun. 21, 2013, the entire contents of which is herein incorporated by reference.

BACKGROUND

The embodiments herein relate generally to motorcycle accessories.

Prior to embodiments of the disclosed invention, saddlebag trays were half the length of a saddlebag. This allowed small items to fall to the bottom of the saddlebag when the motorcycle hit a bump or other action that caused a jolt to the motorcycle. Small items were lost in the saddlebag requiring the operator to dig through the saddlebag or to remove all or several items to find smaller items in the saddlebag. The prior art includes U.S. Pat. No. 8,408,437 issued to Ponsaa.

Ponsaa teaches a saddlebag having a shelf with a plurality of compartments having different dividers, however it does not teach being held in place with brackets. There is no elaborate theory of how the saddlebag is attached to the frame, other than it simply is. In this regard items can easily fall from the shelf in Ponsaa because the shelf is not adequately support. Embodiments of the disclosed invention solve these problems.

SUMMARY

A saddlebag tray system is configured to operate in conjunction with a saddlebag having a saddlebag rear protrusion and a saddlebag forward protrusion. The saddlebag tray system includes a tray configured to entirely traverse the saddlebag and further including: a tray bottom mechanically coupled to side walls which are configured to accommodate the saddlebag rear protrusion and the saddlebag forward protrusion. A plurality of brackets are mechanically coupled to the saddlebag. The side walls are configured to accommodate the plurality of brackets. A handle is mechanically coupled to the tray bottom. Lifting the tray with the handle is configured to lift the tray from the plurality of brackets in the saddlebag.

In some embodiments, the side walls can further comprise a left edge. The left edge is angled inward toward the handle. A front left panel can be formed to be attached to the left edge. A front center panel can be formed to be attached to the front left panel. A front right panel can be formed to be attached to the front center panel. The front center panel can be formed to accommodate the saddlebag forward protrusion by being bent in a slightly concave manner toward the handle.

In some embodiments, the side walls can further comprise a right edge can be formed to be attached to the front right panel. The right edge can be angled outward away from the handle. A rear right panel can be formed to be attached to the right edge. A rear center panel can be formed to be attached to the rear right panel; wherein the rear center panel is formed to accommodate the saddlebag rear protrusion by being concave toward the handle. A rear left panel can be formed to be adjacent to the rear center panel.

In some embodiments, a rear right inward protrusion can be formed in the rear right panel. The rear right inward protrusion can be configured to accommodate a first rear bracket. A rear left inward protrusion can be formed in the rear left panel. The rear left inward protrusion can be configured to accommodate a second rear bracket. A front center right indentation can be formed in the front center panel. The front center right indentation can be configured to accommodate a first front bracket. A front center left indentation can be formed in the front center panel. The front center left indentation can be configured to accommodate a second front bracket.

In some embodiments, a forward right indention can be formed in the front right panel. A rear right indention can be formed in the rear right panel. A front right indentation can be formed in the front right panel. A right divider can be configured to be inserted between the front right indentation, the rear right indention, the rear center panel and the front center right indentation.

In some embodiments, a rear center right indentation can be formed in the rear center panel. A rear left indentation can be formed in the rear left panel. A front left indentation can be formed in the front left panel. A left divider can be configured to be inserted between the rear center right indentation, the rear left indentation, the front center left indentation and the front left indentation.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
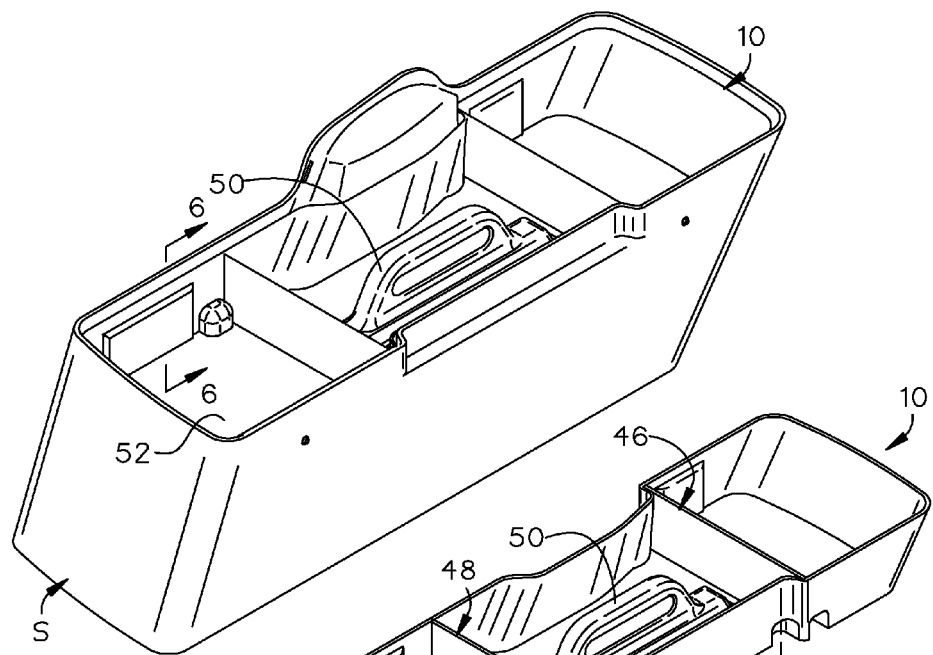
FIG. 1 is a perspective view of an embodiment of the invention shown in place inside the saddlebag.

By way of example, and referring to FIG. 1, a user has saddlebag S and desires to place tray 10 across almost all of the distal points of tray 10 are immediately adjacent to an inner surface on saddlebag S. In this application, that is known as entirely traversing the saddlebag. A saddlebag tray system accomplishes this. The saddlebag tray system comprises tray 10 having a tray bottom 52, which is configured to accompany right divider 46 and left divider 48. Tray 10 is mechanically coupled to handle 50 which facilitates inserting tray 10 into and out of saddlebag S as shown in FIG. 2.

Figure 2:
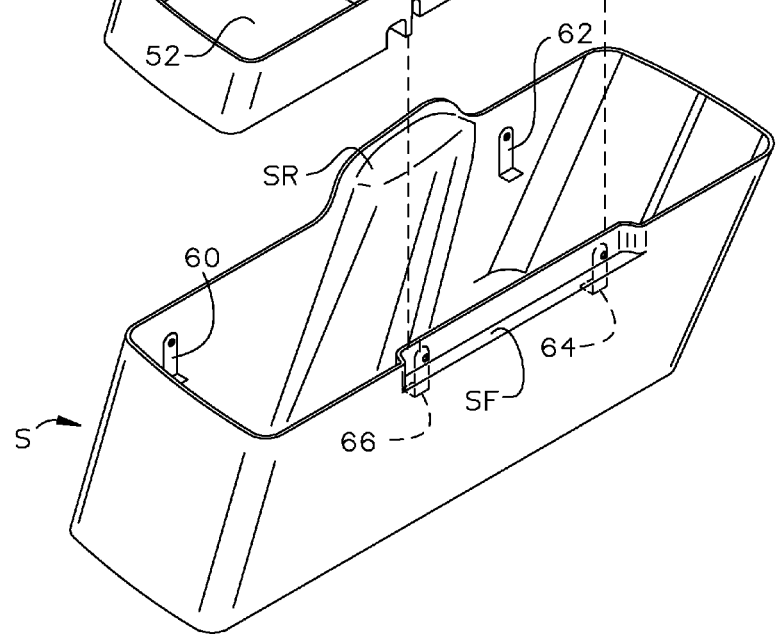
FIG. 2 is an exploded view demonstrating insertion of an embodiment of invention into item the saddlebag.
Figure 6:
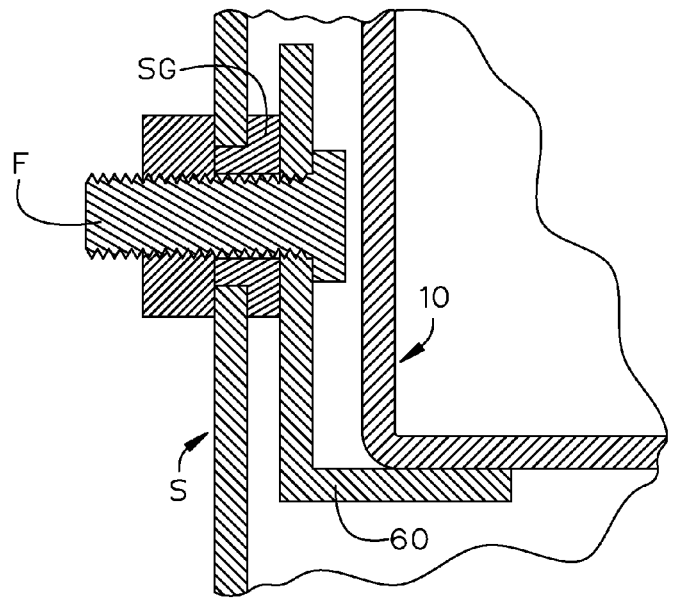
FIG. 6 is a section detail view of an embodiment of the invention along line 6-6 in FIG. 1.

Turning to FIG. 2, saddlebag S further comprises saddlebag rear protrusion SR and saddlebag forward protrusion SF. Saddlebag S is mechanically coupled to a plurality of brackets which are shown to include first rear bracket 60, second rear bracket 62, first front bracket 64, and second front bracket 66. FIG. 6 provides one theory for this connection. Saddlebag S is mechanically coupled to a motorcycle frame (not shown) with fastener F through grommet SG in saddlebag S. Embodiments of the present invention involve removing fastener F and then inserting bracket 60 in front of grommet G before reapplying fastener F.

Figure 3:
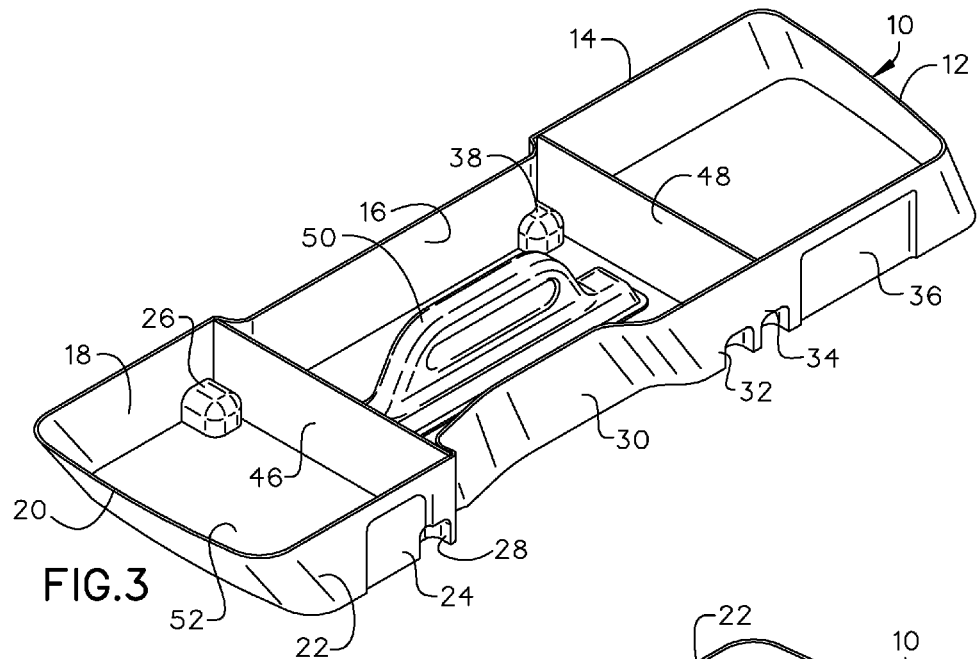
FIG. 3 is a front perspective view of an embodiment of the invention.
Figure 4:
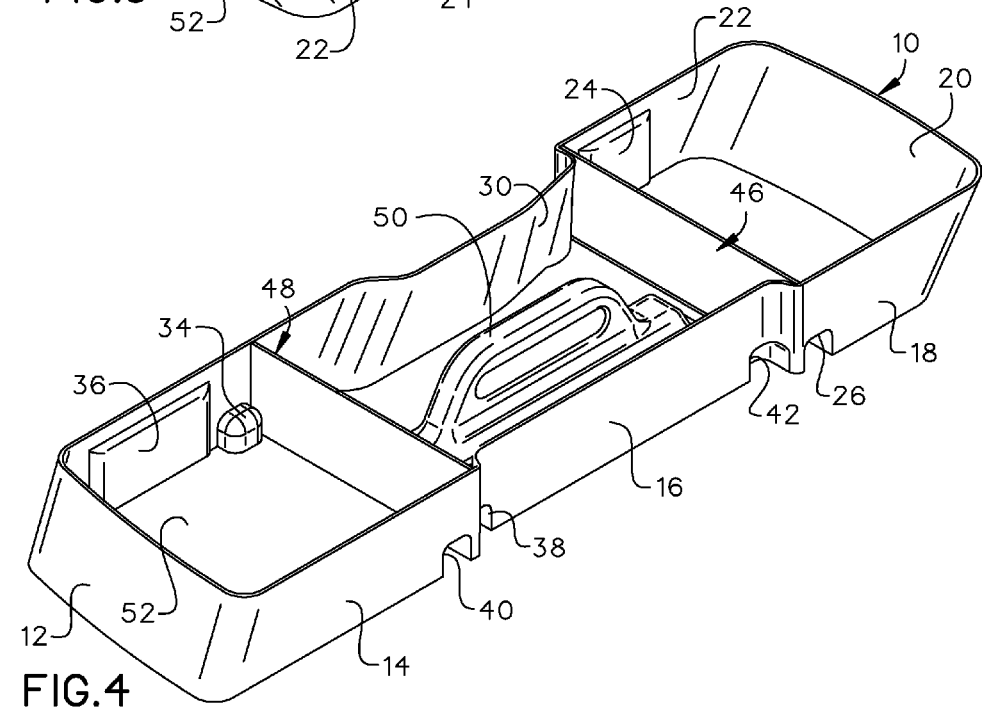
FIG. 4 is a rear perspective view of an embodiment of the invention.
Figure 5:
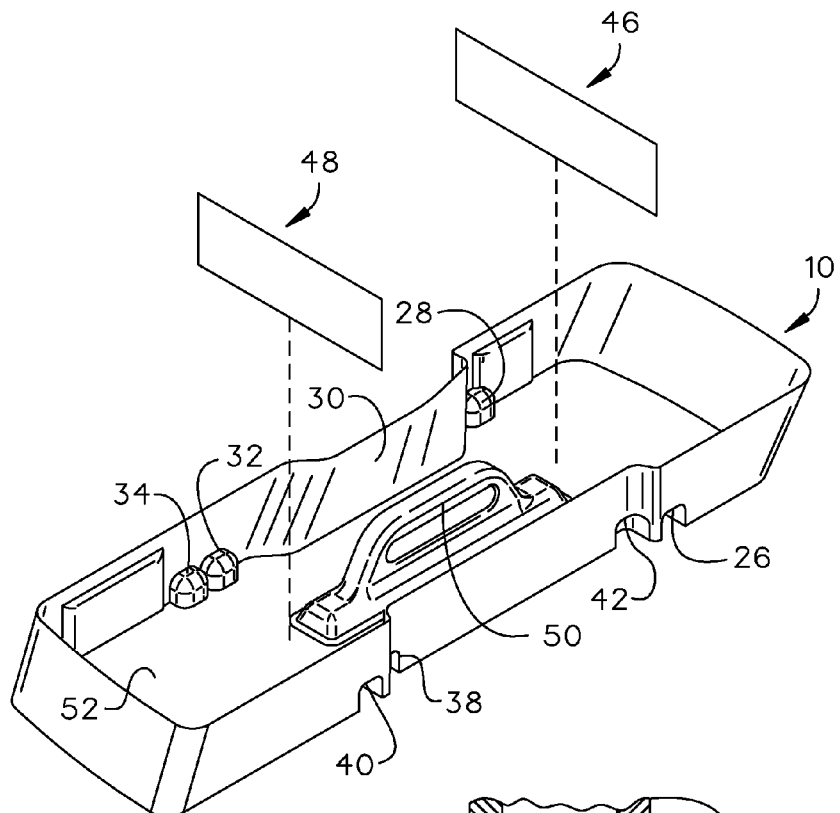
FIG. 5 is an exploded view demonstrating the dividers.

FIG. 3, FIG. 4 and FIG. 5 show tray 10 in more detail. Tray 10 comprises bottom 52 mechanically coupled to side walls. The side walls include: left edge 12 angled inward toward handle 50 and formed to be attached to front left panel 14. Front left panel 14 is formed to be attached to front center panel 16. Front center panel 16 is formed to be attached to front right panel 18. Further, front center panel 16 is formed to accommodate saddlebag forward protrusion SF by being bent in a slightly concave manner toward handle 50. Front right panel 18 is formed to be attached to right edge 20.

Right edge 20 is angled outward away from handle 50. Right edge 20 is formed to be attached to rear right panel 22. Rear right panel 22 further comprises rear right inward protrusion 24 that is configured to accommodate first rear bracket 60. Rear right panel 22 further comprises rear right indention 28. Across tray 10 from rear right indention 28 is forward right indention 26 in front right panel 18.

Rear right panel 22 is formed to be attached to rear center panel 30. Rear center panel 30 comprises rear center right indentation 32. Rear center panel 30 is formed to accommodate saddlebag rear protrusion SR by being bent in a slightly concave manner toward handle 50. Rear center panel 30 is formed to be adjacent to rear left panel 35. Rear left panel 35 further comprises rear left indentation 34 and rear left inward protrusion 36 that is configured to accommodate second rear bracket 62.

Front center panel 16 further comprises front center left indentation 38 and front center right indentation 42. Front center left indentation 38 is configured to accommodate second front bracket 66. Front center right indentation 42 is configured to accommodate first front bracket 64. This operates to hold tray 10 in place.

Front left panel 14 further comprises front left indentation 40. Front right panel 18 further comprises front right indentation 26. In some embodiments, rear center panel 30 can further comprise a rear center right indentation located proximate rear right indention 28 in a manner similar to other indentations. However, it is not required.

As shown in FIG. 5, a user can utilize the indentations to secure the dividers. Right divider 46 can be inserted between front right indentation 26, rear right indention 28, rear center panel 30 and front center right indentation 42. Likewise, left divider 48 can be inserted between rear center right indentation 32, rear left indentation 34, front center left indentation 38 and front left indentation 40.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A saddlebag tray system, configured to operate in conjunction with a saddlebag having a saddlebag rear protrusion and a saddlebag forward protrusion; the saddlebag tray system comprising:
   a tray configured to entirely traverse the saddlebag and further comprising: a tray bottom mechanically coupled to side walls which are configured to accommodate the saddlebag rear protrusion and the saddlebag forward protrusion;
   a plurality of brackets, configured to mechanically couple to the saddlebag; wherein the side walls are configured to accommodate the plurality of brackets;
   a handle, mechanically coupled to the tray bottom;
   wherein lifting the tray with the handle is configured to lift the tray from the plurality of brackets in the saddlebag;
   a left edge; wherein the left edge is angled inward toward the handle;
   a front left panel, formed to be attached to the left edge;
   a front center panel, formed to be attached to the front left panel; and
   a front right panel, formed to be attached to the front center panel; wherein the front center panel is formed to accommodate the saddlebag forward protrusion by being bent in a slightly concave manner toward the handle;
   a right edge formed, to be attached to the front right panel; wherein the right edge is angled outward away from the handle;
   a rear right panel, formed to be attached to the right edge;
   a rear center panel, formed to be attached to the rear right panel; wherein the rear center panel is formed to accommodate the saddlebag rear protrusion by being concave toward the handle;
   a rear left panel, formed to be adjacent to the rear center panel
   a rear right inward protrusion, formed in the rear right panel; wherein the rear right inward protrusion is configured to accommodate a first rear bracket;
   a rear left inward protrusion, formed in the rear left panel; wherein the rear left inward protrusion is configured to accommodate a second rear bracket;
   a front center right indentation, formed in the front center panel; wherein the front center right indentation is configured to accommodate a first front bracket; and
   a front center left indentation, formed in the front center panel; wherein the front center left indentation is configured to accommodate a second front bracket.

2. The saddlebag tray system of claim 1, further comprising:
   a forward right indention formed in the front right panel; and
   a rear right indention formed in the rear right panel;
   a front right indentation formed in the front right panel;
   wherein a right divider is configured to be inserted between the front right indentation, the rear right indention, the rear center panel and the front center right indentation.

3. The saddlebag tray system of claim 2, further comprising:
   a rear center right indentation formed in the rear center panel;
   a rear left indentation formed in the rear left panel; and
   a front left indentation formed in the front left panel;
   wherein a left divider is configured to be inserted between the rear center right indentation, the rear left indentation, the front center left indentation and the front left indentation.

\* \* \* \* \*